United States Patent [19]
Herget et al.

[11] Patent Number: 5,445,671
[45] Date of Patent: Aug. 29, 1995

[54] OFFSET PRINTING INK

[75] Inventors: Gerhard Herget, Ober-Ramstadt; Wolfgang Hechler, Lautertal; Brigitte Husseini, Darmstadt; Heinz Mohr, Speyer; Rudiger Smolka, Bensheim, all of Germany

[73] Assignee: Merck Patent Gesellschaft mit Reschrankter Haftung, Darmstadt, Germany

[21] Appl. No.: 248,014

[22] Filed: May 24, 1994

[30] Foreign Application Priority Data

Jul. 9, 1993 [DE] Germany .................. 43 22 997.2

[51] Int. Cl.$^6$ .................................. C09D 11/02
[52] U.S. Cl. .......................... 106/20 R; 106/27 R; 106/30 R; 106/417; 106/416; 106/418
[58] Field of Search ............ 106/20 R, 30 R, 27 R, 106/417, 418, 416

[56] References Cited

U.S. PATENT DOCUMENTS 4,519,841  5/1985  Moynihan ................ 106/27 R
5,277,711  1/1994  Schmidt et al. .......... 106/418

FOREIGN PATENT DOCUMENTS 2903212  7/1980  Germany .

*Primary Examiner*—Helene Klemanski
*Attorney, Agent, or Firm*—Millen, White, Zelano & Branigan

[57] ABSTRACT

The present invention relates to a low-viscosity offset printing ink which essentially comprises a binder, additives and 5–40% by weight of pearlescent pigments and has an improved transfer behavior for pearlescent pigments.

14 Claims, No Drawings

OFFSET PRINTING INK

BACKGROUND OF THE INVENTION

This invention relates to a low-viscosity offset printing ink which essentially comprises a binder, additives and 5–40% by weight of pearlescent pigments Offset printing inks generally comprise binders, pigments or dyes and additives. In the case of print products for packaging prints, labels and high-quality magazines, a frequent requirement is the imparting of high gloss to the printed articles.

All offset printing inks containing pearlescent pigments have a disadvantage in that they have problems with stability during continuous printing. They tend to accumulate rapidly on the inking system, printing plate and blanket, so that problem-free continuous printing of more than 10,000 sheets is generally impossible. Furthermore, the glossing of such prints is generally unsatisfactory, due to the inadequate amount of pigments transferred to the print products. The concentration of pigment in the ink drops over the transport path over inking system, plate and blanket. The pigment accumulates at exposed areas on the plate and blanket and results in piling and caking. In general, only pearlescent pigments having a very small mean particle size are suitable, since the particle size is critical for pigment transfer in offset printing. Such pigments only exist for pearl-white and pastel-shaded inkings, but not for gold, silver, bronze and copper shades, in which there is a great deal of interest. It has hitherto not been possible to produce such shades satisfactorily in the offset method using pearlescent pigments.

The use of bismuth oxychloride pigment platelets in order to achieve a pearlescent effect likewise gives unsatisfactory results, since the pigment particles are very sensitive to mechanical shear forces and are ground down in the ink nip.

The use of pearlescent pigments in printing inks for offset printing is described in DE 29 03 212, which discloses the pigmenting of a commercial oil-based printer's varnish containing a preferably very finely divided pearlescent pigment. The offset printer's varnish preparation described therein is distinguished by the fact that the proportion of pearlescent pigments is very high, the upper limit of the pigment concentration in the suspension essentially being limited only by the mixture flowability required. The proportion of pearlescent pigments is in the range up to 65% by weight. Varnishes having such a high proportion of pigments are very viscous and may have to be made more flowable using a thinner so as to be processable in conventional offset printing machines. Experiments have shown that, in contrast to the teaching of DE 29 03 212, the transfer of pigment from inking system to the substrate is adversely affected at such high pigment levels. Problems such as piling and caking occur during continuous printing, i.e. the achievable pearlescent effect cannot be optimized simply by using a high level of pigments. Furthermore, the ink systems of DE 29 03 212 generally have inadequate dot sharpness, so that the ink systems described therein are essentially restricted to printing on full-color areas.

SUMMARY OF THE INVENTION

An object was therefore to find an offset printing ink preparation which contains pearlescent pigments, but nevertheless has none of the above-mentioned disadvantages.

Surprisingly, it has been found that the quality of the pearlescent effect and the amount of transferred pigment particles becomes optimum at printing ink viscosities <15 Pas. The novel pigmented printing ink has viscosities <12 Pas, preferably <8 Pas. The printing inks show no problems with splashing from the inking roller systems, even at printing rates of 10,000 sheets per hour. For optimum pigment transfer from inking system to the substrate, the pearlescent pigment:nonvolatile ink component ratio is important. The ratio should not be too high, since otherwise the pigment may be transported in an unsatisfactory manner. The pigment:non-volatile ink component ratio is preferably <0.40, in particular <030.

The invention therefore relates to a low-viscosity offset printing ink essentially comprising binders, pigments and additives, characterized in that it contains, based on the printing ink, 5–40% by weight of pearlescent pigments or pearlescent pigment mixtures based on substrate platelets coated with one or more metal oxides or metal oxide mixtures and has a viscosity of <12 Pas.

A further feature of the invention is that the pearlescent pigment:non-volatile ink component ratio is <0.40.

The essential constituent of the novel offset printing ink is the pearlescent pigment or pearlescent pigment mixture. The proportion of pearlescent pigments in the offset printing ink is preferably about 5–40% by weight, more preferably about 10–30% by weight. Even at low pigment concentrations, print products of high pearlescence are obtained, in contrast to the prior art. The ink/water balance must, of course, be monitored during pigmenting and, if necessary, corrected in order to ensure problem-free continuous printing without piling on the rolls. Regarding the ink/water balance, the water adsorption of the binder depends on the polarity of the resin. High acid value number ·.· high content of saponifiable carbonyl groups ·.· high water adsorption.

Suitable base substrates for the coating are transparent substrate platelets. Preferred substrates are phyllosilicates and metal oxide-coated platelet-shaped materials. Particularly suitable are mica, talc, kaolin, bismuth oxychloride, flakes of glass, $SiO_2$ or synthetic ceramics or flakes of glass or synthetic phyllosilicates, like synthetic mica, flakes of $SiO_2$ produced on a endless belt in accordance with International Application WO 93/08237, DE 41 34 600 and U.S. patent application Ser. No. 08/211,791, synthetic support-free platelets or other comparable materials. Also suitable are metal platelets, such as, for example, aluminum platelets or platelet-shaped metal oxides, such as, for example, iron oxide platelets and mica coatings containing colored or colorless metal oxides, such as $TiO_2$, $Fe_2O_2$, $SnO_2$, $Cr_2O_3$, ZnO and other metal oxides, alone or in a mixture in a uniform layer or in successive layers. These pigments, known as pearlescent pigments, are disclosed, for example, in the German patents and patent applications 14 67 468, 19 59 998, 20 09 566, 22 14 545, 22 15 191, 22 44 298, 23 13 331, 25 22 572, 31 37 808, 31 37 809, 31 51 343, 31 51 354, 31 51 355, 32 11 602 and 32 35 017. The printing ink is preferably prepared using pearlescent pigments. In particular $TiO_2$— and/or $Fe_2O_3$-coated mica pigments, $SiO_2$ flakes or glass flakes are used.

In addition to the finely divided pearlescent pigments, coarse particles can also be used in the print formulation to ensure optimum transfer properties of the binder. The novel printing ink preferably contains particles having a mean particle size $D_{50}$ of about 4–100 μm, in particular 5–20 μm. Pearlescent pigments having a mean particle size $D_{50}$ of 10 μm exhibit interesting gold, silver, bronze and copper shades in the offset method.

In addition to the pearlescent pigments, the offset printing ink can be pigmented by means of carbon black, metal effect, fluorescent and/or organic colored pigments. The pigment then preferably comprises about 50–100% by weight of pearlescent pigment and about 0–50% by weight of carbon black or metal effect, fluorescent and/or colored pigment. However, the total pigment content in the printing ink preferably does not exceed 40% by weight.

The binder or the non-volatile content of the novel pearlescent offset printing ink comprises known synthetic or natural resins, drying oils, mineral oils and additives, as described, for example, in Karsten, Lackrohstofftabellen [Paint Raw Material Tables], 9th edition, 1992. The resins used preferably have a relatively low melt or solvent viscosity. However, highly polymerized and highly viscous components may also be present. Combinations of hard resins and alkyd resins have proven particularly suitable, since these wet the pearlescent pigments better and give prints with greater gloss and greater abrasion fastness. In particular, the binders used are preferably composed of about 50–90% by weight of hard resin and about 5–50% by weight of alkyd resin. The hard resins used are preferably hydrocarbon resins. The hydrocarbon resins used can have an acid number of close to 0 mg of KOH/g of substance, but may also have been modified and have acid numbers of <50, e.g. up to 30 mg of KOH/g of substance. Furthermore, the binder can contain about 1–50% by weight of a mineral oil. The ink components are matched to one another in such a way that a stable ink/water balance which is suitable for low ink viscosities is achieved. The ink contains about 40–95% by weight of binder.

The offset printing ink is dried by oxidative polymerization of the resins and by means of oils, such as, for example, linseed oil, tung oil or castor oil, which are absorbed by the paper during printing. The drying operation can be further accelerated by addition of drying catalysts (siccatives), usually salts of fatty acids with cobalt, lead, manganese, etc. The proportion of drying oils in the novel offset printing inks is in the range preferably from 0 to about 50% by weight, more preferably from 0 to about 30% by weight. Other additives can be introduced into the printing ink in order to modify the ink properties for specific applications. These additives can be wax compounds, drying agents, dispersants, solvents, thickeners, lubricants, pigment fillers and/or antioxidants. Further details on the basic properties of offset printing inks are given in A. Rosenberg, Der Polygraph (11), 1153 (1987) B. Grande, Coating (4), 138 (1987), and The Printing Ink Manual, 4th Ed., 1988.

If the very low-viscosity offset printing inks according to the invention containing pearlescent pigments do not have sufficient dot sharpness required for fine screens in order to prevent clogging of the print, than the printer's varnishes can be structured. Thus, addition of a structure former can sufficiently improve the dot sharpness. The novel offset printing ink then preferably contains 0.1–3% by weight of a structure former. In addition to the improved dot sharpness, a printer's varnish modified in this way exhibits significantly improved pigment transfer and better continuous printing properties.

A further feature of the invention is thus that the offset printing ink preferably contains <10% by weight of additives. A further feature of the invention is that the offset printing ink preferably contains 0.1–3 % by weight of a structure former.

The offset printing ink preparation is prepared by dispersing the pearlescent pigment in the ink with the aid of a ball mill, sand mill or roll mill (triple roll mill), if desired at various dispersion temperatures. During this operation, the pigment particles are coated by the binder, The grinding pastes emerging from the equipment are subsequently mixed with the additives to give the finished product.

The choice of the resins in the binders and the content of pearlescent pigments in the offset printing ink allow the parameters important to the printing process, such as dispersability, tack and viscosity, to be set individually. Viscosity and tack are dependent on one another in the same ink formulations, but can also be specifically modified individually by specific ink formulation. It should be noted here that printing inks having excessive tack can cause parts of the paper to tear (pitting). Inks having inadequate tack are not transferred in a suitable manner during the printing operation. If the penetration of the ink is excessive, the ink becomes visible on the opposite side of the paper or causes a spotty or unclear print. Poorly controlled penetration can cause smearing or set-off. By contrast, excessively viscous inks do not flow from the feed sources to the rolls in a suitable manner. The offset printing inks on the market are set at viscosities in the range from 12 to 30 Pas. By contrast, the novel printing inks can be set to viscosities <12 Pas, preferably <10 Pas, in particular <8 Pas.

The offset printing ink can be used both for web-fed offset printing and for sheet-fed offset printing by the dry or wet method; however, it is particularly suitable for sheet-fed offset printing by the wet method. The very good rheological properties of the novel offset printing ink give very high printing rates. It is readily possible to print 10,000 sheets per hour, with no problems with continuous printing and with screen dot sharpness.

The use of the novel offset printing ink is of particular importance with respect to artwork in the advertising sector and for high-quality print products, since the finished prints satisfy extremely high demands in aesthetic terms due to their pearlescence.

The examples below are intended to illustrate the invention in greater detail, but without representing their limitation.

In the foregoing and in the following examples, all temperatures are set forth uncorrected in degrees Celsius; and, unless otherwise indicated, all parts and percentages are be weight.

The entire disclosure of all applications, patents and publications, cited above and below, and of corresponding German application No. P 43 22 997.2, filed Jul. 9, 1993, is hereby incorporated by reference.

EXAMPLES

1. Example 1—Comparative Example

A "fine ink" sheet-fed offset printing ink from Nippon Ink Company is printed with addition of "Aquastabil" damping solution from Hartmann Druckfarben.

The damping solution (5% in water) is modified by means of 5% of 2% phosphoric acid.

Printing plate: Kalle p5S, Kalle, Wiesbaden
Blanket: Perfect Dot mx, Streb

After 2,000 sheets, significant build-up of pigment on the printing plate and blanket are observed. The pearlescent effect is assessed as inadequate. The viscosity is 25 Pas, with a proportion of 30% by weight of $TiO_2$/mica pearlescent pigments having a mean particle size $D_{50}$ of 6 μm.

Example 2

A commercially available oil-based printer's varnish 11A0524 from Gebrüder Schmidt, Frankfurt, is pigmented with Iriodin 123 Hellglanzsatin [pale gloss satin] (containing $TiO_2$-coated mica pigment having a mean particle size $D_{50}$ of 10 μm) or Iriodin 323 Royal Goldsatin [gold satin] (containing $Fe_2O_3$/$TiO_2$-coated mica pigment having a mean particle size $D_{50}$ of 10 μm from E. Merck, Darmstadt, Germany) in increasing proportions. The printing trials are carried out as described in Example 1. The corresponding viscosities and pigment and binder ratios are shown in Table 1.

Example 3

85 g of the commercially available printer's varnish 11A0524 from Gebrüder Schmidt, Frankfurt, are mixed with a mixture of 0.5 g of Aliso B (structure former from Manchem) and 0.5 g of mineral oil PKWF 28/31 (Haltermann) and the mixture is homogenized. The mixture is pigmented with 15 g of Iriodin 123 Hellglanzsatin [pale gloss satin] (containing $TiO_2$-coated pearlescent pigment having a mean particle size $D_{50}$ of 10 μm), giving a printing ink having a viscosity 72 of 5.2 Pas. The ink is printed on a Heidelberger MO at 6,000 sheets/hour under the printing conditions from Experiment 1. The ink shows no tendency to build up over the entire printing time. Continuous printing is stable, and prints having optimum glossing are obtained. Furthermore, the ink is distinguished by excellent dot sharpness. The results are shown in Table 1.

Example 4

15 g of Bentone 38 (NL Chemicals) are added to 230 g of oil-based printer's varnish 11A0524 from Gebrüder Schmidt, Frankfurt, and the mixture is homogenized using a high-speed stirrer. The suspension is converted into a paste using 5 g of isopropanol.

Example 5

650 g of the commercially available printer's varnish 11A0524 from Gebrüder Schmidt, Frankfurt are mixed with 200 g of the stock paste (Example 4), and the mixture is stirred until homogeneous. The mixture is pigmented with 150 g of Iriodin 123 Hellglanzsatin [pale gloss satin], giving a printing ink having a viscosity of 6.2 Pas. The ink is printed analogously to Example 3. The results are shown in Table 1.

Example 6

64.7 g of a hydrocarbon resin Hercules A 101 (Hercules B. V.) are boiled at 200° C. with 16.0 g of mineral oil PKWF28/31 from Haltermann (Anilinpoint=82) and 19.3 g of a refined linseed oil having a viscosity of >90 Pas under a nitrogen atmosphere to give a varnish.

15.0 g of Alftalat 810 (Hoechst) are converted into a paste, together with 20 g of Iriodin 111 Feinsatin [fine satin] (containing $TiO_2$-coated mica pigment having a mean particle size $D_{50}$ of 6 μm from E. Merck, Darmstädt, Germany) and 3 g of oleic acid (E. Merck), and subsequently converted into a homogeneous ink using 59 g of the hydrocarbon varnish, 1.5 g of mineral oil PKWP 28/31 (Haltermann) and 1.5 g of 2,2,4-trimethyl-1,3-pentanediol diisobutyrate (Eastman). The ink is completed with 0.83 g of drying agent (chromium and manganese salts) from Hartmann. The viscosity of the finished printing ink is 5.5 Pas. The results are shown in Table 1.

II. Results

The viscosity is measured in accordance with DIN 53222 (1990) at 25° C. Evaluation uses the Casson method, and the plastic viscosity is determined in accordance with the formula $$n^- = 0.1 \cdot g/s \cdot C \cdot a^2 [Pas]$$

where
g=acceleration due to gravity,
S=frictional area of the falling rod,
C=instrument constant, determined by calibration of the measurement apparatus using a 20000 Å calibration oil from PTB, Brunswick and Berlin,
a=slope on the regression line y=ax+b where $y = \sqrt{m_1 + m_0}$, $x = \sqrt{1/t}$ where $m_i$=load weight and $m_o$=mass of the falling rod.

All units are CGS units (centimetre, gram, second).

The pearlescent pigment:non-volatile printing ink component ink ratio is determined in accordance with the DIN 53219 standard. The samples are dried to constant weight at 110° C. and under a vacuum of 5 mm Hg.

The pearlescent effect achieved is assessed visually. In addition, photomicrographs are prepared and the number of pearlescent pigment platelets per unit area is determined.

TABLE 1

| Constituents of the printing ink [% by weight] | Example | | | | | | |
|---|---|---|---|---|---|---|---|
| | 2 | 2 | 2 | 2 | 3 | 5 | 6 |
| Binder 11A0524 (Gebruder Schmidt, Frankfurt) | 83 | 78 | 78 | 77 | 83 | 83 | — |
| Binder from Example 6 | — | — | — | — | — | — | 80 |
| Iriodin 111 Feinsatin | — | — | — | — | — | — | 20 |
| Iriodin 123 Hellglanssatin | 15 | 20 | 30 | — | 15 | 15 | — |
| Iriodin 323 | — | — | — | 20 | — | — | — |

TABLE 1-continued

| Constituents of the printing ink [% by weight] | Example | | | | | | |
|---|---|---|---|---|---|---|---|
| | 2 | 2 | 2 | 2 | 3 | 5 | 6 |
| Royal Goldsatin RED colorant (Kast + Ehinger) | 2 | 2 | 2 | — | 2 | 2 | — |
| YELLOW colorant (Kast + Ehinger) | — | — | — | 3 | — | — | — |
| P/NF[1] | 0.229 | 0.296 | 0.417 | 0.226 | 0.227 | 0.228 | 0.206 |
| $\eta_\infty$ [Pas] | 4.8 | 4.5 | 5.7 | 4.5 | 5.2 | 6.2 | 5.5 |
| Printing trial (run in thousands) | >10 | — | 0.4 | — | >5 | 3.5 | — |
| Effect[2] | 4 | — | 3 | — | 5 | 5 | — |

[1] Pearlescent pigment weight/weight of non-volatile printing ink component ratio = P/NF
[2] Gradation (microscopic evaluation of the pring pattern)
1 = very little; 2 = little; 3 = moderate; 4 = considerable; 5 = considerable The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In an offset printing ink comprising a binder, a pigment and optionally additives, the improvement wherein the ink contains 5-20% by weight of a pearlescent pigment, and has a viscosity of <12 Pas at 25° C.

2. An offset printing ink according to claim 1, wherein the pearlescent pigment comprises $TiO_2$— and/or $Fe_2O_3$-coated mica platelets, $SiO_2$ flakes, glass flakes, or synthetic phyllosilicates.

3. An offset printing ink according to claim 1, wherein the pearlescent pigment has a mean particle size $D_{50}$ of about 4-100 μm.

4. An offset printing ink according to claim 1, wherein the ink contains about 40-95% by weight of binder.

5. An offset printing ink according to claim 1, wherein the proportion of additives is <10% by weight.

6. An offset printing ink according to claim 1, wherein the binder comprises about 50-90% by weight of hard resin, about 5-50% by weight of alkyd resin and 0 to about 50% by weight of drying oils.

7. An offset printing ink according to claim 6, wherein the hard resin is a hydrocarbon resin or a modified hydrocarbon resin having an acid number of <50 mg of KOH/g of substance.

8. An offset printing ink according to claim 1, wherein the pearlescent pigment:non-volatile printing ink component ratio is <0.40.

9. An offset printing ink according to claim 1, wherein the pigment component comprises about 50-100% by weight of pearlescent pigments and 0 to about 50% by weight of carbon black or metal effect, fluorescent or colored pigments.

10. An offset printing ink according to claim 1, wherein the ink contains about 0.1-3% by weight of a structure former.

11. An offset printing ink according to claim 1, wherein the binder contains about 1-10% by weight of mineral oil.

12. An offset printing ink according to claim 1, wherein the ink contains less than 20% by weight of pearlescent pigment.

13. An offset printing ink according to claim 1, wherein the ink contains 5-15% by weight of pearlescent pigment.

14. An offset printing ink according to claim 1, wherein the ink contains 5-10% by weight of pearlescent pigment.

* * * * *